Patented Feb. 8, 1938

2,107,905

UNITED STATES PATENT OFFICE 2,107,905

CHLORINATED ARALKYL KETONES

Anderson W. Ralston and Carl W. Christensen, Chicago, Ill., assignors to Armour and Company, Chicago, Ill., a corporation of Illinois No Drawing. Application March 9, 1937,
Serial No. 129,944

7 Claims. (Cl. 260—131)

This invention relates to chlorinated aralkyl ketones and processes of preparing the same, and it comprises as new compounds chlorinated aralkyl ketones having the general structure

R—CO—R', wherein R is a phenyl, tolyl or xylyl radical and R' is a heptadecyl radical, it further comprises processes wherein such ketones are chlorinated with chlorine gas to give compounds containing chlorine in the heptadecyl radical, and to give compounds containing chlorine in both the heptadecyl and the aryl radical.

In our co-pending application Serial Number 104,703, we have described xylylheptadecyl ketones which are normally liquid. These xylylheptadecyl ketones are composed of mixtures of ortho, meta and para xylyl ketones, and they are useful as lubricants and in lubricating compositions. This is because they possess high chemical stability, are not easily oxidized, and form strong, permanent lubricating films.

We have now extended our investigations of aralkyl ketones and have discovered a new class of aralkyl ketones which are also useful in lubricants, as plasticizers, and in many other relations. We have discovered that aralkyl ketones having the general formula R—CO—R' wherein R is a phenyl, tolyl or xylyl radical and R' is a heptadecyl radical can be chlorinated under conditions which give mono or dichloro derivatives, or even higher chlorinated compounds. These chlorinated ketones are extremely stable chemically, and they are non-corrosive to metals at high temperatures. When added to lubricating oils they markedly increase the oiliness and film-forming properties of the oil. Although the liquid xylylheptadecyl ketones of the aforesaid co-pending application are markedly useful as lubricants, or as constituents of lubricating mixtures, the addition of one or two chlorine atoms greatly enhances film strength.

The ketones we chlorinate can be prepared readily from stearyl chloride and the corresponding aromatic hydrocarbon by a Friedel-Crafts reaction. Thus, for example, stearyl chloride, $C_{17}H_{35}COCl$, is reacted with benzene in the presence of aluminum chloride to give phenylheptadecyl ketone. Stearyl chloride reacted with toluene give tolylheptadecyl ketone, and ordinary xylene containing a mixture of xylene isomers will give liquid xylylheptadecyl ketones.

Having prepared the ketone to be chlorinated, we then treat the ketone with chlorine advantageously in the presence of a trace of iodine as a catalyst. Depending upon conditions we can introduce either one, two or more chlorine atoms into the molecule. At relatively low temperatures only monochlorinated derivatives are formed, the chlorine entering in the heptadecyl radical. At higher temperatures two chlorine atoms can be substituted in the molecule, one of which is in the heptadecyl radical and the other in the aryl radical of the ketone. Under still more drastic conditions three or more chlorine atoms can be substituted, but we are not certain where the chlorine substitutes after a chlorine atom has become a single substituent in the alkyl and aryl radicals.

We shall now describe ways of preparing chlorinated xylylheptadecyl ketones as examples of practicing our invention. The phenyl and tolyl derivatives can be prepared in like manner.

For preparing a monochlorinated derivative of xylylheptadecyl ketone we charge a suitable reaction vessel with one molecular weight, 372 parts by weight, of a liquid mixture of isomeric xylylheptadecyl ketones. A trace of iodine, usually only a crystal or two, is added and chlorine gas is slowly introduced over a period of about six hours. The mixture is kept at approximately room temperature and cooled if it exceeds about 30° C. From time to time the reaction vessel and contents is weighed and when one atomic weight, 35.5 parts by weight, of chlorine has been added the flow of chlorine is discontinued.

The product is then removed from the reaction vessel, admixed with an aqueous solution of sodium thiosulfate to remove any dissolved, unreacted chlorine, and the oily, water insoluble, reaction product separated by stratification from the sodium thiosulfate solution.

The monochlorinated derivative is a reddish-yellow liquid having the following characteristics.

Specific gravity_____ 0.930
Refractive index_____ 1.4970
Boiling point_____ 152–188/1 mm.
Viscosity Saybolt_____ {98 seconds at 100° F.
                              {40 seconds at 210° F.
Flash point_____ 410° F.
Fire point_____ 495° F.
Pour point_____ 54° F.

The product can be distilled without decomposition and is extremely thermostable.

When we wish to make a dichlorinated derivative we simply increase the temperature of the reaction to approximately 60° C. and continue chlorination until the increase in weight of the reaction product indicates that two atomic weights, or 71 parts by weight, of chlorine have been introduced. The dichlorinated product is a dark-colored oil which has the following characteristics.

| | |
|---|---|
| Specific gravity | 1.027 |
| Viscosity Saybolt | {315 seconds at 100° F. <br> 53 seconds at 210° F. |
| Flash point | Over 460° F. |
| Pour point | 10° F. |

By still more drastic chlorination we can introduce three or more chlorine atoms and such products are dark reddish, viscous oils which decompose on distillation. For most purposes we prefer to stop the chlorination when two atomic weights of chlorine have been introduced.

The addition of about 0.5 per cent by weight of the monochlorinated xylylheptadecyl ketone to an S. A. E. 30 lubricating oil raises the transition point on a Stephen's consistometer from 172° F. to 195° F. To those skilled in the art this will indicate that the chlorinated material has greatly increased the oiliness of the original oil.

The dichlorinated derivatives of xylylheptadecyl ketone are particularly useful as extreme pressure lubricants. Equal parts by weight of the dichlorinated compounds and Pennsylvania Bright stock, a well-known lubricant, carry a load of 4,250 pounds when tested in a Faville-LeVally machine under continuous loading conditions.

As stated above, the chlorine atom in the monochlorinated derivative is in the alkyl group, most probably in a position alpha to the carbonyl group. In the dichlorinated compound one is in the heptadecyl radical and the other in the aryl radical, although its exact position in the ring has not been determined.

In exactly the same way we can prepare monochlorinated phenylheptadecyl ketone by chlorinating phenylheptadecyl ketone at relatively low temperature until the amount of chlorine required by theory has been taken up. This compound is a light-brown, pasty mass having the following characteristics.

| | |
|---|---|
| Flash point | 365° F. |
| Fire point | 415° F. |
| Freezing range | 84–87° F. |
| Sp. G./25° C | 0.989 |

The dichlorinated derivative of phenylheptadecyl ketone is a reddish-brown liquid with the following characteristics.

| | |
|---|---|
| Flash point | 385° F. |
| Fire point | 438° F. |
| Freezing range | 47–50° F. |
| Sp. G./25° C | 1.050 |

Monochlorinated tolylheptadecyl ketone is a viscous reddish-brown liquid, the characteristics of which are as follows.

| | |
|---|---|
| Flash point | 390° F. |
| Fire point | 435° F. |
| Freezing range | 59–62° F. |
| Sp. G./25° C | 0.998 |

The dichlorinated tolylheptadecyl ketone is also a viscous reddish-brown liquid of the following characteristics.

| | |
|---|---|
| Flash point | 415° F. |
| Fire point | 455° F. |
| Freezing range | 50–54° F. |
| Sp. G./25° C | 1.041 |

Mixtures of different mono and dichlorinated ketones can be prepared by starting with mixtures of the ketones. Likewise, mixtures of mono and dichlorinated derivatives of the same compound can be prepared by controlling the amount of chlorine added so that it lies between one and two atomic weights for each molecular weight of the ketone starting material.

Having thus described our invention what we claim is:

1. Chlorinated ketones of the general structure R—CO—R' wherein R is an aryl radical chosen from the group consisting of phenyl, tolyl and xylyl, and R' a heptadecyl radical containing a chlorine substituent.

2. Chlorinated ketones of the general structure R—CO—R' wherein R is a chlorine-containing aryl radical chosen from the group consisting of chlorinated phenyl, tolyl and xylyl, and R' is a heptadecyl radical containing a chlorine substituent.

3. Monochlorinated xylylheptadecyl ketone.

4. Dichlorinated xylylheptadecyl ketone.

5. The process which comprises chlorinating with free chlorine a ketone of the general formula R—CO—R' wherein R is an aryl radical chosen from the group consisting of phenyl, tolyl and xylyl and R' is a heptadecyl radical.

6. The process which comprises chlorinating a xylylheptadecyl ketone at a temperature not exceeding about 60° C.

7. The process which comprises chlorinating a xylylheptadecyl ketone at a temperature not exceeding about 30° C.

ANDERSON W. RALSTON.
CARL W. CHRISTENSEN.